United States Patent [19]

Nüsser

[11] Patent Number: 4,616,518
[45] Date of Patent: Oct. 14, 1986

[54] SLIDING-LINK MECHANISM

[75] Inventor: Hermann Nüsser, Markgröningen, Fed. Rep. of Germany

[73] Assignee: Robert Bosch GmbH, Stuttgart, Fed. Rep. of Germany

[21] Appl. No.: 645,375

[22] Filed: Aug. 29, 1984

[30] Foreign Application Priority Data

Oct. 21, 1983 [DE] Fed. Rep. of Germany ....... 3338242

[51] Int. Cl.$^4$ ........................ F16H 21/44; F16H 51/02
[52] U.S. Cl. ......................................... 74/96; 74/522; 74/571 M
[58] Field of Search ................... 74/96, 107, 211, 522, 74/571 R, 571 M

[56] References Cited

U.S. PATENT DOCUMENTS

| | | | |
|---|---|---|---|
| 2,267,740 | 12/1941 | Knox | 474/112 |
| 3,075,403 | 1/1963 | Hepner | 74/522 |
| 3,488,955 | 1/1970 | Buelow | 74/96 |
| 4,084,449 | 4/1978 | Kine | 74/522 |
| 4,465,640 | 8/1984 | Dougherty | 74/571 R |

FOREIGN PATENT DOCUMENTS

| | | | |
|---|---|---|---|
| 1023268 | 1/1958 | Fed. Rep. of Germany | 74/96 |
| 532434 | 11/1921 | France | 74/96 |
| 604800 | 7/1948 | United Kingdom | 74/107 |

Primary Examiner—Lawrence Staab
Attorney, Agent, or Firm—Edwin E. Greigg

[57] ABSTRACT

A sliding-link mechanism is proposed, which serves in particular to actuate a throttle device in the intake tube of an internal combustion engine. The sliding-link mechanism is disposed by way of example on a throttle valve assembly and includes a variable-fulcrum lever, which is firmly connected to a shaft and has a kidney-shaped oblong slot groove, which is engaged by a roller rotatably supported on a shaft. The shaft is secured on a roller lever, which with a hub is seated on an eccentric sleeve, which can be rotatable about a shaft secured to the throttle valve assembly. The eccentric sleeve and the hub have meshing teeth which by axial displacement relative to one another become disengaged, so that by rotating the eccentric sleeve the position of the roller lever relative to the variable-fulcrum lever can be varied in such a way that in the outset position the roller comes to rest on the end of the oblong slot groove. Subsequently the eccentric sleeve is displaced axially relative to the hub in such a way that the teeth mesh with one another and the eccentric sleeve is fixed on the hub.

2 Claims, 2 Drawing Figures

SLIDING-LINK MECHANISM

BACKGROUND OF THE INVENTION

The invention is based on a sliding-link mechanism such as has already been proposed for actuating a throttle valve in the intake tube of an internal combustion engine. There, the position of the throttle valve is adjusted with a predetermined quantity of air, resulting in various positions for the variable-fulcrum lever. Given the various dimensional tolerances of the individual parts, the roller disposed on the roller lever then is no longer located in the correct position in the oblong slot groove of the variable-fulcrum lever, thereby resulting in a distortion of the desired movement.

OBJECT AND SUMMARY OF THE INVENTION

The sliding-link mechanism according to the invention as defined hereinafter has the advantage over the prior art that the position of the roller in the oblong slot groove can be established accurately, so that the desired movement is produced.

Further advantages will be revealed in this application, particularly with respect to the sliding-link mechanism revealed herein. In a particularly advantageous feature of the invention, the eccentric sleeve can be fixed in the hub.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
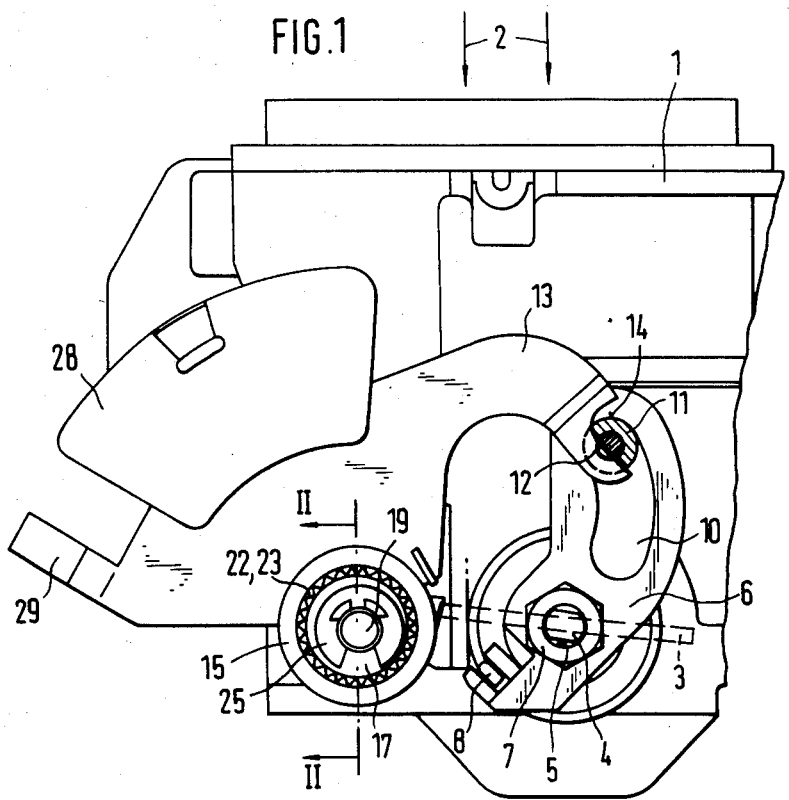
FIG. 1 shows a sliding-link mechanism according to the invention in simplified form, disposed on a throttle valve assembly of an internal combustion engine.
Figure 2:
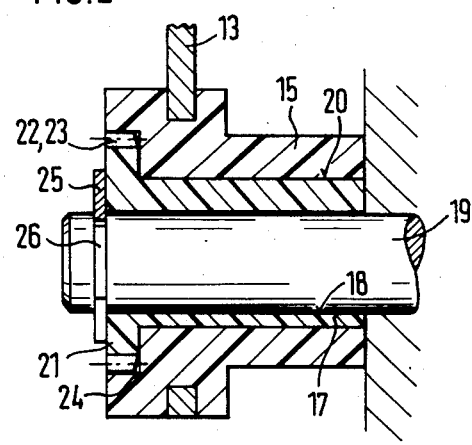
FIG. 2 is a fragmentary sectional view taken along the line II—II of FIG. 1.

FIG. 1 shows a known throttle valve assembly 1 as it is disposed on the intake tube of an internal combustion engine. The air aspirated by the engine flows into the throttle valve assembly 1 downstream of an air filter (not shown) in the direction of an arrow 2, its flow quantity being determined by the angular position of a throttle valve 3, shown in dashed lines, in the throttle valve assembly 1. The throttle valve 3 is connected with a shaft 4 that passes through the throttle valve assembly 1 and is rotatably supported therein. At one end, the shaft 4 protrudes out from the throttle valve assembly 1 and has at least one flattened area 5, onto which a variable-fulcrum lever 6 having a correspondingly embodied through bore is fitted, being secured tightly on the shaft 4 by means of a nut 7. The nut 7 can be threaded onto a threaded section of the shaft 4. When the variable-fulcrum lever 6 rotates clockwise, the throttle valve 3, which is rotated simultaneously with the shaft 4, opens the flow cross section in the throttle valve assembly 1. The clockwise movement of the throttle vale 3 and variable-fulcrum lever 6 is effected counter to the force of a torsion spring 8, which is disposed concentrically with the shaft 4 and with its one end engages the throttle valve assembly 1 and with the other end engages the variable-fulcrum lever 6. The variable-fulcrum lever 6 is provided with an oblong slot groove 10 curved in the shape of a kidney, into which a roller 11 protrudes. The roller 11 is rotatably supported about a shaft 12, one end of which is secured in a roller lever 13. The end of the roller lever 13 oriented toward the variable-fulcrum lever 6 is shown partially cut away, so that the roller 11 disposed behind the roller lever 13 in the viewer's direction and the end 14 of the oblong slot groove 10 remote from the shaft 4 are visible. The roller lever 13 is connected with a hub 15, which is disposed on an eccentric sleeve 17 (shown more clearly in FIG. 2) which is supported with a bearing bore 18 on a shaft 19 which is secured at one end in the throttle valve assembly 1. The bearing bore 18 of the eccentric sleeve 17 extends eccentrically with respect to the jacket face 20 of the eccentric sleeve 17. Remote from the throttle valve assembly 1, the eccentric sleeve 17 has a collar 21, which is provided with outer teeth 22 which are capable of meshing with inner teeth 23 of a depression 24 in the hub 15. Securing the axial position of the eccentric sleeve 17 and the hub 15 is effected by means of a snap ring 25 which engages a groove 26 of the shaft 19. Also connected to the roller lever 13 are a guide body 28 and a holder element 29, so that (although this is not shown) a cable can engage the holder element 29 and be guided over the guide body 28, the other end of the guide body 28 being engaged by the so-called gas pedal of the engine.

To adjust the sliding-link mechanism, the position of the throttle valve 3 in the throttle valve assembly 1 is now adjusted with a predetermined air quantity. This determines the position of the variable-fulcrum lever 6 as well as that of the oblong slot groove 9 with respect to the roller 11, which because of the many tolerances of the various parts is no longer located at the correct position in the oblong slot groove 10, causing a distortion of the desired movement. To correct this, the hub 15 and hence the roller lever 13 are therefore supported on the eccentric sleeve 17, which can be pulled out, once the snap ring 25, with its outer teeth 22, has been removed from the inner teeth 23, and rotated far enough that the roller 11 comes to rest at the end 14 of the oblong slot groove 10. In this position, the eccentric sleeve 17 is again pushed axially toward the hub 15, so that the outer teeth 22 can lock into place in the inner teeth 23 in order to fix the eccentric sleeve 17 in the hub 15. Subsequently the snap ring 25 is re-introduced into the groove 26 of the shaft 19, in order to secure the axial position.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A sliding-link mechanism for actuating a throttle device provided in a housing in an intake tube on an internal combustion engine, comprising a roller lever rotatably supported about a roller lever shaft attached to said housing and a variable-fulcrum lever connected at one end with a throttle shaft associated with said throttle device, said roller lever including a roller means constructed and arranged to engage an oblong slot groove in said variable-fulcrum lever, said roller lever shaft further having a hub including an aperture which engages an eccentric sleeve that is rotatable with respect to said hub, said eccentric sleeve further having a bearing bore extending eccentrically with respect to a jacket face of said eccentric sleeve, whereby said eccentric sleeve is slidably disposed on said shaft, said eccentric sleeve includes a shoulder and said hub includes a recess with said shoulder and said recess comprising interengaging sets of teeth to provide for relative adjustment of said roller lever and said variable-fulcrum lever.

2. A sliding-link mechanism as defined by claim 1, further wherein said roller lever and said variable-fulcrum lever are capable of being locked against inadvertent movement.

* * * * *